United States Patent [19]

Ritsema

[11] 4,387,901
[45] Jun. 14, 1983

[54] RETRACTION SEAL FOR A DISC BRAKE WITH ANTI-NIBBLING FEATURE

[75] Inventor: Irving R. Ritsema, South Bend, Ind.

[73] Assignee: The Bendix Corporation, Southfield, Mich.

[21] Appl. No.: 355,999

[22] Filed: Mar. 8, 1982

[51] Int. Cl.³ .............................. F16J 15/18; F16J 9/20
[52] U.S. Cl. ...................................... 277/165; 277/12; 277/171; 277/188 A; 92/168
[58] Field of Search .................. 277/165, 168–172, 277/12, 32, 212 FB, 188 R, 188 A; 92/165 R, 168

[56] References Cited

U.S. PATENT DOCUMENTS 3,377,076 4/1968 Burnett .............................. 277/171
3,915,461 10/1975 Gautier .............................. 92/168 X
4,156,532 5/1979 Kawaguchi et al. ............. 277/170 X

FOREIGN PATENT DOCUMENTS 2326047 12/1973 Fed. Rep. of Germany ...... 277/165

Primary Examiner—Robert S. Ward, Jr.
Attorney, Agent, or Firm—Paul David Schoenle; Ken C. Decker

[57] ABSTRACT

A retraction seal (32) for a disc brake is disposed within a caliper groove (34). The retraction seal (32) cooperates with a forward wall (42) of the groove (34) to define a space (72) which substantially prevents the retraction seal (32) from engaging a radially inner edge (80) of the forward wall (42) during braking, thereby preventing nibbling of the retraction seal (32).

8 Claims, 5 Drawing Figures

RETRACTION SEAL FOR A DISC BRAKE WITH ANTI-NIBBLING FEATURE

This invention relates to a retraction seal for a disc brake.

A retraction seal for a disc brake wherein a caliper defines a bore for receiving a piston, the bore includes a groove for receiving the retraction seal in an installed condition so that the latter sealing engages the caliper and the piston.

In U.S. Pat. No. 3,915,461 a retraction seal for a disc brake comprises a square resilient member which is installed within a caliper groove. During braking the retraction seal deflects axially to engage a forward wall of the groove. Consequently, with repeated braking application, it is possible for the retraction seal to be damaged by "nibbling" at a radially inner forward edge, thereby adversely affecting the retraction capabilities of the retraction seal.

During braking, the fluid pressure generated in a disc brake pressure chamber acts against the retraction seal to bias the latter outwardly into tight engagement with the piston and the edge of the groove at the radially inner and axially outer corner of the groove. The retraction seal tends to creep into the clearance between the wall of caliper bore and the piston and is pinched therebetween. Repeated braking applications cause the radially inner and axially forward portion of the retraction seal to wear or "nibble". It is believed that a uniform gripping engagement between the radially inner surface of the retraction seal and the piston is necessary in order to consistently retract or withdraw the piston into the caliper bore upon termination of braking. Several retraction seals used today adequately retract the piston initially; however, after about a year of vehicle operation the retraction seal is worn or nibbled to such a degree that the engagement between the retraction seal and the piston is no longer uniform. Consequently, retraction is inadequate and the piston opposes separation between an inner friction pad and a rotor or disc upon termination of braking to generate disc brake drag for the vehicle.

The retraction seal of the present invention is characterized in that said retraction seal defining an outer diameter in its free state which is greater than an outer diameter defined by the groove, said retraction seal defining an inner diameter in its free state which is substantially equal to an outer diameter defined by the piston, the groove including a forward surface having a first portion extending substantially normal to the direction of movement for the piston during braking and a second portion extending substantially from an inner diameter of the groove to define a first angle relative to the normal direction, said retraction seal including a forward wall facing said forward surface, said forward wall including an inner section opposite said second portion which defines a second angle relative to the normal direction and said first angle is substantially equal to said second angle which is about 30 degrees, the bore receiving the piston to deform said retraction seal into the groove whereby said inner section and said second portion cooperate to define a spacing which permits deformation of said retraction seal into said space during braking in order to generate a resilient restoring force biasing the piston into the bore upon termination of braking.

It is an advantage of the present invention that the portion of the retraction seal in engagement with the piston remains spaced from the wall of the groove to substantially prevent "nibbling" of the radially inner edge at a forward wall.

The invention will now be described with reference to the accompanying drawings wherein.

Figure 1:
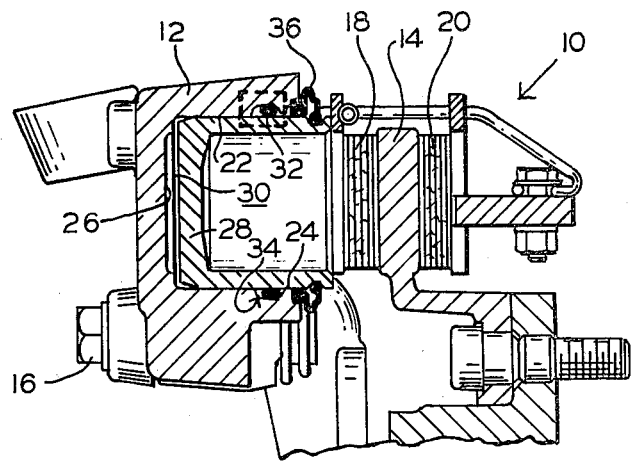
FIG. 1 is a side cross-sectional view of a disc brake including a retraction seal constructed in accordance with the present invention.

A disc brake 10 includes a caliper 12 movably mounted relative to a disc 14 via suitable means, such as a pin assembly 16. The caliper cooperates with a pair of friction pads 18 and 20 during braking to engage the friction pads 18 and 20 with the disc 14 to retard rotation of the latter. The caliper 12 defines a bore 22 leading from an opening 24 to an end wall 26. A piston 28 is received within the bore 22 and extends from the opening 24 to oppose the friction pad 18. The piston cooperates with the caliper end wall 26 to define a pressure chamber 30 which is capable of receiving fluid pressure from a fluid pressure generator such as a master cylinder (not shown) during a brake application.

Figure 2:
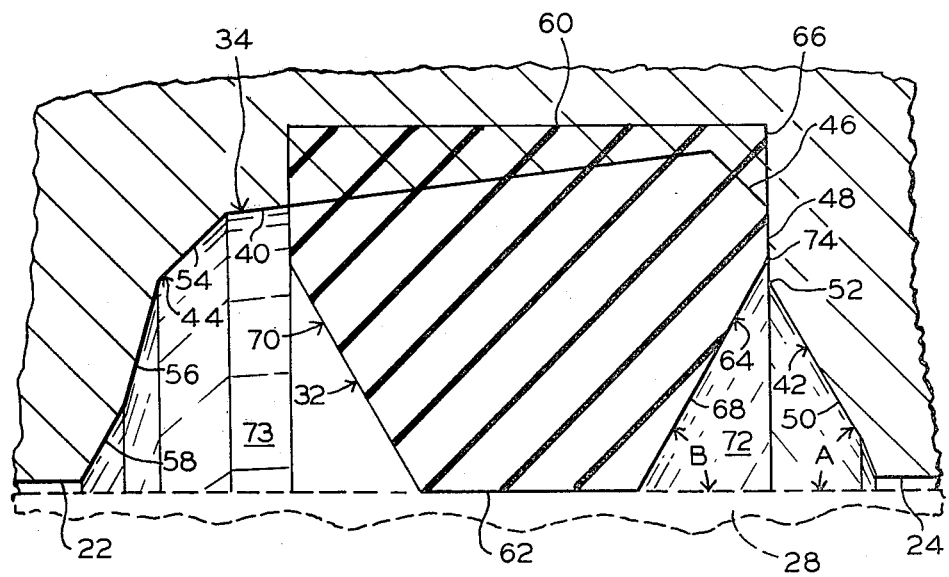
FIG. 2 is an enlarged view of the circumscribed portion of FIG. 1 showing the retraction seal before it is installed.

In order to seal the pressure chamber from the environment and also to provide retraction for the piston 28 upon termination of braking, a retraction seal 32 is disposed within a groove 34 formed on the wall of bore 22 near the opening 24. A dust boot 36 extends between the end of the piston 28 and the wall of the bore 22 to prevent particles from entering the sliding interface defined between the piston 28 and the wall of the bore 28. Turning to FIG. 2, the groove 34 includes a bottom surface 40 connecting a forward surface 42 and a rear surface 44. The forward surface includes a tapered corner 46, a first portion 48 extending normal to the direction of movement for the piston 28, and a second portion 50 extending from the bore 22 to an edge 52 formed between the first and second portions. The second portion 50 defines an angle A relative to the wall of bore 22. The rear surface 44 includes tapered corner 54, a tapered first portion 56 and a tapered edge 58 adjoining the wall of bore 22. The forward surface 42 cooperates with the rear surface 44 to define an axial dimension for the groove 34 which increases from a radially outer position to a radially inner position. In FIG. 2, the retraction seal 32 is shown overlaying the groove 34 in its uninstalled or free state. The retraction seal 32 defines an outer surface 60 having a radial dimension larger than the radial dimension for the groove 34. An inner surface 62 on the retraction seal 32 defines a radial dimension substantially equal to the radius of the piston 28. The retraction seal 32 includes a forward wall 64 comprising an outer section 66 and an inner section 68. The outer section extends in a normal direction relative to piston movement and the inner section 68 defines an angle B relative to the wall of bore 22. The retraction seal 32 includes a rear wall 70 which is identical to the forward wall 64 so that the retraction seal is reversible for simple installation into the groove 34.

The inner section 68 cooperates with the section portion 50 to define a triangular-shaped spacing 72 with angle A being substantially equal to angle B. The rear wall 70 cooperates with the rear surface 44 to define a chamber 73.

Figure 3:
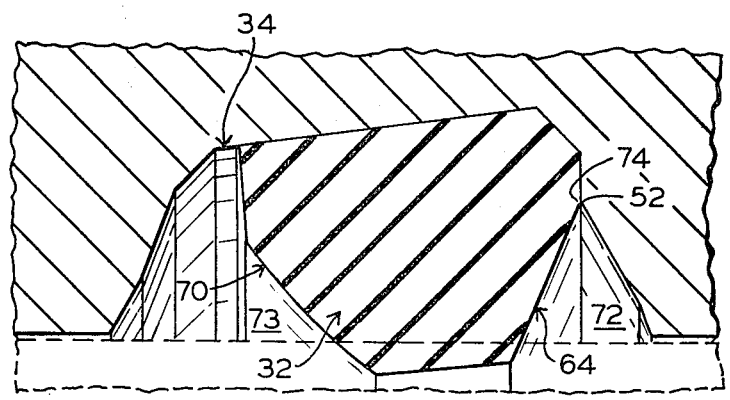
FIG. 3 is a view similar to FIG. 3 showing the retraction seal disposed within a groove before the piston is disposed within a caliper bore.

When the retraction seal is installed in the groove 34, the retraction seal is deformed such that its inner surface 62 defines an interference fit with the piston 28. In FIG. 3, it is seen that the edge 74 between the inner section 68 and outer section 66 is substantially aligned with the edge 52. The rear wall 70 is rotated counter-clockwise in response to the taper of the bottom surface 40.

When the piston 28 is inserted into the bore 22, the retraction seal 32 is further deformed to be retained within the groove 34. Although the cross-sectional area or volume of spacing 72 is reduced, the inner section 68 retains its cooperation with the second portion 50 in order to define the spacing 72. In particular, the inner section 68 defines the angle C which is slightly greater than the angle B. The angle C opens toward the second portion 50 and the angle A opens toward the inner section 68. The retraction seal 32 defines an axial dimension which substantially decreases from a radially outer position to a radially inner position, so that the smallest axial dimension for the installed retraction seal is located at the engagement with the piston 28.

During braking, fluid pressure is communicated to the pressure chamber 30 to bias the piston 28 to the right. In FIG. 5 the fluid pressure within chamber 30 is communicated to the chamber 73 by means of a radial spacing between the bore 22 and the piston 28. Fluid pressure within the chamber 73 acts against the rear wall 70 to deform the retraction seal 32 such that the radially inner portion adjacent the inner surface 62 is deflected to the right to move with the piston 28. The dimensions of the spacing 72 before fluid pressure is communicated to the pressure chamber 30, see FIG. 4, enable the retraction seal 32 to be deformed during braking in the direction of the forward wall 64 but remain spaced therefrom at the radially inner edge 80. The retraction seal is biased into engagement with a portion of the second portion 50 and the angle thereof relative to the direction of piston movement urges the deformed retraction seal into tight engagement with the piston 28. With the retraction seal 32 remaining spaced from the radially inner edge 80 of forward wall 64, the retraction seal 32 is not subjected to nibbling or wear at the edge 80. Therefore, the inner surface 62 of the retraction seal remains substantially in uniform engagement with the piston 28.

Figure 4:
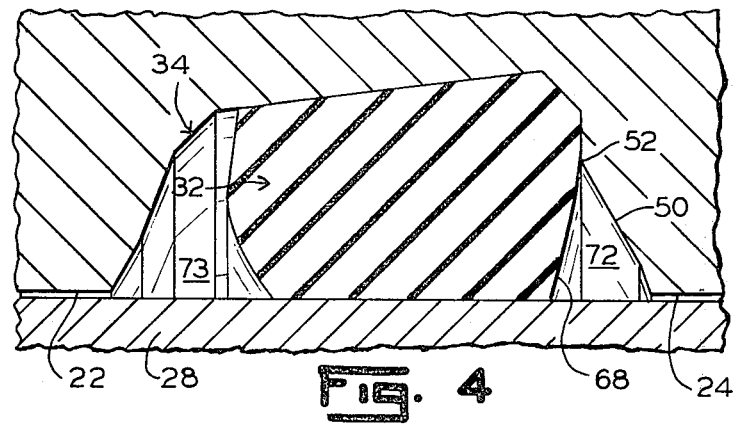
FIG. 4 is an enlarged view of FIG. 1.
Figure 5:
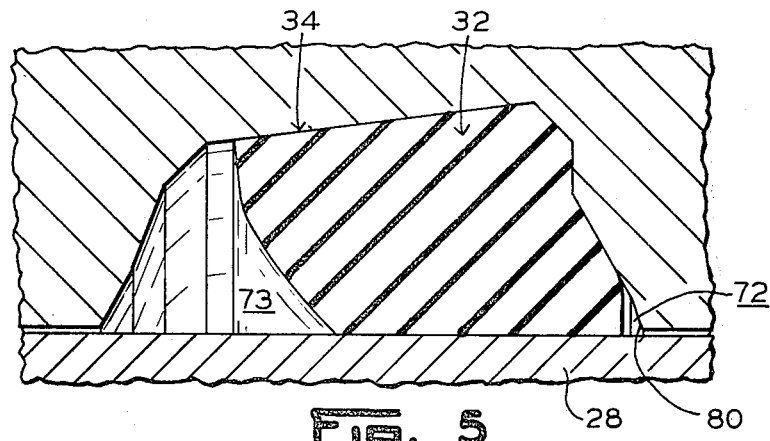
FIG. 5 is a view similar to FIG. 4 showing the retraction seal during a brake application.

Upon termination of braking, the fluid pressure within chambers 30 and 73 is relieved so that the deformed retraction seal will return to its compressed configuration as shown in FIG. 4 in response to the inherent resiliency thereof. As the retraction seal is returning to its compressed state, the inner surface 62 is moving to the left so that the engagement between inner surface 62 and piston 28 causes the piston 28 to move to the left to the position shown in FIG. 4.

I claim:

1. A retraction seal for a disc brake wherein a caliper defines a bore for receiving a piston, the bore includes a groove for receiving the retraction seal in an installed condition so that the latter sealingly engages the caliper and the piston, characterized by said retraction seal defining an outer diameter in its free state which is greater than an outer diameter defined by the groove, said retraction seal defining an inner diameter in its free state which is substantially equal to an outer diameter defined by the piston, the groove including a forward surface having a first portion extending substantially normal to the direction of movement for the piston during braking and a second portion extending substantially from an inner diameter of the groove to define a first angle relative to the normal direction, said retraction seal including a forward wall facing said forward surface, said forward wall including an inner section opposite said second portion which defines a second angle relative to the normal direction and said first angle is substantially equal to said second angle which is about, the bore receiving the piston to deform said retraction seal into the groove whereby said inner section and said second portion cooperate to define a spacing which permits deformation of said retraction seal into said space during braking in order to generate a resilient restoring force biasing the piston into the bore upon termination of braking, said retraction seal being deformed during braking to move axially into said spacing which is large enough to receive said deformed retraction seal and prevent full engagement between said inner section and said second portion.

2. The retraction seal of claim 1 in which said spacing (72) is substantially triangular shaped in a plane coinciding with the axis for the piston.

3. The retraction seal of claim 1 in which said retraction seal (32) is deformed during braking to move axially into said spacing (72) which is large enough to receive said deformed retraction seal and prevent full engagement between said inner section (68) and said second portion (50).

4. The retraction seal of claim 1 in which said retraction seal includes a rear wall (70) having an inner section defining an angle relative to the normal direction such that said inner sections of said forward and rear walls are identical to permit reversible installation of said retraction seal into the groove.

5. The retraction seal of claim 1 in which said second portion and said inner section extend radially inwardly from edges which substantially adjoin each other when said retraction seal is disposed in the groove and engaging the piston and said edges are disposed radially outwardly from the wall so that a spacing always exists between said seal and said groove wall near said bore.

6. The retraction seal of claim 5 in which said retraction seal (32) defines a radially outer axial dimensions substantially equal to a radially outer axial dimension for the groove, said retraction seal defining a substantially gradually decreasing axial dimension over the radial dimension for said retraction seal, the groove defining a substantially gradually increasing axial dimension over the radial dimension for the groove whereby the smallest axial dimension (62) for said retraction seal is engaging the piston to permit the smallest axial dimension for said retraction seal to move axial within the largest axial dimension for the groove.

7. A retraction seal for a disc brake comprising, in combination, a caliper having a bore with a groove, the bore receiving a piston which is movable within the bore during braking, the groove receiving the retraction seal which sealingly engages the caliper and the piston, said retraction seal defining an axial dimension which decreases in a radially inward direction, the groove defining an axial dimension which increases in a radially inward direction such that the smallest axial dimension portion of said retraction seal is engaging the piston at the largest axial dimension of the groove, said retraction seal being movable axially with the piston to generate a restoring force which is operable upon termination of braking to withdraw the piston into the bore and the groove axial dimension providing for said retraction seal to move with the piston without said retraction seal coming in contact with the wall of the groove substantially adjacent the piston, said retraction seal cooperating with the wall of the groove to substantially define a triangular space at a forward radially inner end of said retraction seal and said retraction seal extending partially into said triangular space during movement of said piston so that a spacing always exists between said seal and said groove wall near said bore.

8. The retraction seal of claim 7 in which said retraction seal cooperates with the wall of the groove to substantially define a triangular space at a forward radially inner end of said retraction seal.

* * * * *